C. F. STEPHENSON.
ANTISLIPPING DEVICE FOR VEHICLE WHEELS.
APPLICATION FILED MAY 22, 1918.
1,320,940.
Patented Nov. 4, 1919.
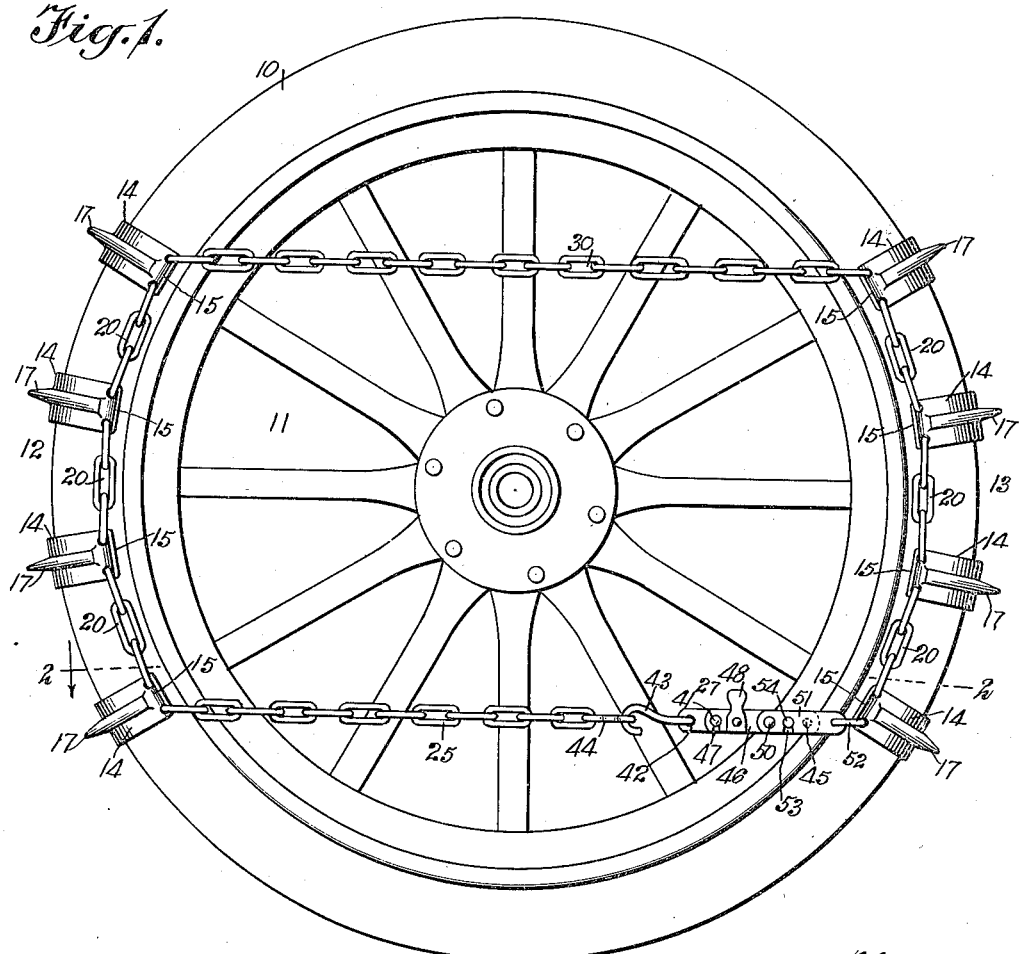
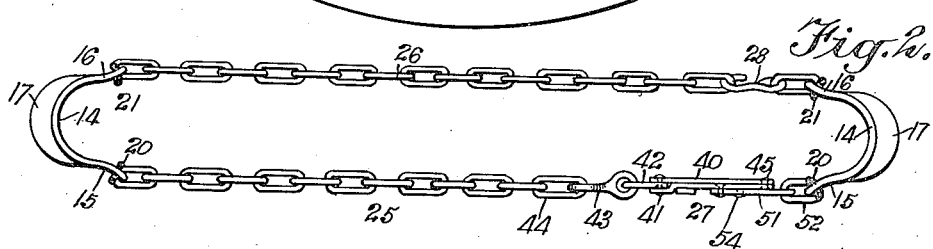
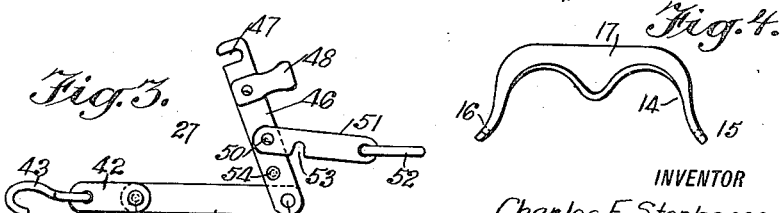
WITNESSES
INVENTOR
Charles F. Stephenson
BY
ATTORNEYS

UNITED STATES PATENT OFFICE.

CHARLES FRANCLIN STEPHENSON, OF FOSTORIA, OHIO.

ANTISLIPPING DEVICE FOR VEHICLE-WHEELS.

1,320,940.  Specification of Letters Patent.  Patented Nov. 4, 1919.

Application filed May 22, 1918. Serial No. 236,036.

*To all whom it may concern:*

Be it known that I, CHARLES FRANCLIN STEPHENSON, a citizen of the United States, and a resident of Fostoria, in the county of Seneca and State of Ohio, have invented a new and Improved Antislipping Device for Vehicle-Wheels, of which the following is a full, clear, and exact description.

The invention relates to automobiles, auto-trucks and similar power vehicles, and its object is to provide a new and improved anti-slipping device for vehicle wheels to prevent the same from slipping especially when the vehicle is traveling over a soft roadway. Another object is to permit the attendant of the vehicle to conveniently and quickly place the device in position on the wheel or to remove it therefrom without requiring jacking up of the vehicle. Another object is to provide an anti-slipping device which is simple and durable in construction and takes up very little room when not in use to permit of conveniently carrying the device along in a tool box or other receptacle on the vehicle.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of the antislipping device as applied to a vehicle wheel;

Fig. 2 is a sectional plan view of the antislipping device on the line 2—2 of Fig. 1, the wheel being omitted;

Fig. 3 is an enlarged side elevation of the chain opening and closing means with the parts in open position; and Fig. 4 is an edge view of a lug for an autotruck wheel having a double tread.

The anti-slipping device is applied to the tire 10 of a vehicle wheel 11 and the said device consists essentially of two sets of lugs 12 and 13 fitting the tire 10 at diametrically opposite points, as plainly illustrated in Fig. 1. Each of the lugs of the two sets of lugs 12 and 13 consists of a segmental band 14 having its ends 15 and 16 curved outwardly, as plainly indicated in Figs. 1 and 2, and each band 14 is shaped to straddle and snugly fit onto the tire 10. A rib 17 extends integrally from the outer face of the band 14, and this rib 17 is disposed transversely of the band and radially relative to the wheel 11. The rib 17 is preferably made with beveled sides so that the rib takes a firm hold in the soft ground to prevent the wheel from slipping.

The lugs of each set of lugs are connected with each other by outer and inner connecting chains 20 and 21 attached to the bands at the curved ends 15 and 16, as plainly shown in Figs. 1 and 2. The end lugs are connected with each other by connecting outer and inner chains 25 and 26, of which the outer chain 25 is provided with an opening and a closing means 27, and the chain 26 is provided with a hook 28 for opening and closing this chain. The other end lugs of the two sets of lugs 12 and 13 are permanently connected with each other by ordinary chains 30. The opening and closing means 27 for the outer chain 25 is arranged as follows: On a main bar 40 is arranged a pivot 41 engaged by a short link 42 provided with a hook 43 adapted to hook onto the adjacent link 44 of the chain 25. On the main bar 40 is pivoted at 45 a hook bar 46 provided at its free end with a hook 47 adapted to hook onto the pivot 41. The hook bar 46 is provided with a suitable handle 48 adapted to be taken hold of by the attendant of the vehicle to permit the attendant to conveniently swing the hook bar 46 into or out of engagement with the pivot 41. On the hook bar 46 is pivoted at 50, that is, intermediate the ends of the said hook bar, a link 51 connected with a chain link 52 attached to the outwardly curved end 15 of the end lug of the set of lugs 13, as plainly indicated in Figs. 1 and 2. The link 51 is provided with a notch 53 adapted to engage a stud 54 held on the hook bar 46.

When it is desired to place the anti-slipping device in position on the tire 10 of the wheel 11 then the hook 28 is disengaged from the corresponding link of the chain 26 and the hook member 46 is swung into open position and the hook 43 is disengaged from the link 44 of the chain 25. Two sets of lugs 12 and 13 can now be readily placed in position on opposite sides of the tire 10 of the wheel 11 with the chains 30 uppermost and extending approximately in a horizontal plane a distance above the center of the wheel thus holding the lugs of the two sets in spaced relation on the wheel tire 10. The attendant now engages the hook 28 of the inner lower chain 26 with the corresponding link of this chain and then engages the hook 43 with the link 44 of the outer lower chain 25. The operator next swings the hook bar 46 downward into closed position, that is, until its hook 47 engages the stud 41. During this downward swinging movement of the hook bar 46 the link 51 is drawn to the left thus tightening the connection between the lowermost lugs of the two sets of lugs 12 and 13. It is understood that the hook bar 46 extends alongside the main bar 40 and the link 51 overlies the hook bar 46 when the latter is in closed position.

The hook bar 46 and the link 51 are not liable to open accidentally as they engage the pivot 41 and the stud 54, respectively. It will be noticed that by the arrangement described, the two sets of lugs can be readily spaced in position on the tire 10 of the wheel 11 and fastened in position without requiring jacking up of the vehicle. It will further be noticed that by providing each lug with a band and transverse rib the wheel is held against slipping as soon as such rib enters the soft ground of the roadway.

When it is desired to remove the anti-slipping device from the vehicle it is only necessary for the operator to swing the hook bar 46 into an open position to allow of disconnecting the hook 43 from the link 44, after which the hook 28 is disengaged from its link on the inner chain 26. The two sets of lugs can now be removed readily from the tire together with their connecting chains 20, 21, 25, 26 and 30.

It is understood that the band 14 of each lug is shaped to correspond to the cross section of the tire. For tires having double treads the band 14 is made double with a single rib extending from one side to the other, as plainly shown in Fig. 4.

Having thus described my invention, I claim as new and desire to secure by Letters Patent:—

1. An anti-slipping device for vehicle wheels, comprising two sets of anti-slipping lugs on opposite sides of a wheel tire, the lugs in each set being spaced apart and fitting the wheel tire, and chains connecting the ends of the lugs of each set with each other circumferentially of the wheel, chains connecting the end lugs of the two sets of lugs with each other across the wheel, one of the chains having a hook for opening and closing such chain and the corresponding chain being provided with a link made in sections adapted to be opened and closed.

2. An anti-slipping device for vehicle wheels, comprising two sets of lugs, the lugs of each set being flexibly connected together and the sets being adapted to be placed on a wheel diametrically opposite each other, chains on opposite sides of the wheel and connecting the lugs at one end of the sets with each other, and chains on opposite sides of the wheel and connecting the other end lugs of the sets of lugs with each other, the last-named chains having opening and closing means and one of the said chains having in addition to the opening and closing means a tightening device.

CHARLES FRANCLIN STEPHENSON.